United States Patent Office 3,586,723
Patented June 22, 1971

3,586,723
PREPARATION OF DIALKYL DISULFIDES
Forrest C. Alley, Clemson, S.C., assignor to Westvaco Corporation, New York, N.Y.
No Drawing. Filed Dec. 11, 1968, Ser. No. 783,149
Int. Cl. C07c 149/12
U.S. Cl. 260—608     6 Claims

ABSTRACT OF THE DISCLOSURE

A method of preparing lower dialkyl disulfides by contacting gas stream comprising a lower alkyl mercaptan and an oxygen-containing gas with an activated carbonaceous catalytic adsorbent, wherein the relative humidity at initial contact is at least 70 percent and the contact temperature is between 27° C. and 82° C. and recovering the thus formed dialkyl disulfide from the carbonaceous adsorbent.

---

This invention relates to a process for the preparation of lower dialkyl disulfides. More specifically, this invention relates to a process for preparation of dialkyl disulfides having from two to eight carbons by oxidation of the corresponding alkyl mercaptan in an oxidizing gas in the presence of a carbonaceous catalytic adsorbent wherein the initial contact humidity is at least 70 percent relative humidity and recovering the thus formed dialkyl disulfide.

The conversion of lower alkyl mercaptans to dialkyl disulfides in the presence of an oxygen-containing gas is well known; however, production of dialkyl disulfides has required the employment of various specialty catalysts which are either expensive or have resulted in low product yields. Prior attempts to form dialkyl disulfides by oxidation of their corresponding mercaptans have employed various catalysts, such as cupric chloride adsorbed on an inert support, described in U.S. Pat. 2,501,792. Another catalyst comprising a metal oxide coated onto steel wool or activated charcoal is described in U.S. Pat. 2,028,303. Other pertinent prior art teaching the oxidation of mercaptans in the presence of a carbonaceous catalyst include U.S. Pat. 2,859,249 and U.S. Pat. 2,979,532. These patents require, in addition to activated carbon, some additional catalyzing agent, such as a metallic oxide. Each of these catalysts are deficient for various reasons, among them, formation of side products resulting from excessively high operating temperatures.

It is the general object of the present invention to provide an improved process for converting lower alkyl mercaptans to their corresponding dialkyl disulfides, particularly dimethyl disulfide, in the presence of a carbonaceous catalytic adsorbent.

Other objectives of the present invention will be apparent to those skilled in the art from the following disclosure.

It has been found that dialkyl disulfides may be formed by reacting a gas stream of a lower alkyl mercaptan and an oxygen-containing gas in contact with an activated carbonaceous catalytic adsorbent when the initial contact relative humidity is at least 70 percent and the temperature is between 27° C. and 82° C. and the thus formed dialkyl disulfide will remain adsorbed onto the carbonaceous adsorbent. The conversion of a lower alkyl mercaptan to its corresponding disulfide is represented by the reaction using methyl mercaptan by way of example.

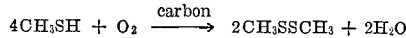

$$4CH_3SH + O_2 \xrightarrow{carbon} 2CH_3SSCH_3 + 2H_2O$$

A lower alkyl mercaptan and an oxygen-containing gas are fed into a reaction chamber and conversion to disulfide proceeds according to the reaction. The dialkyl disulfide formed by the reaction adsorbs onto the carbonaceous adsorbent. The oxygen-containing gas may be pure oxygen, or an oxidizing gas containing free oxygen, such as air. There must be at least two percent by volume of oxygen in the gas mixture for the reaction to occur efficiently, although the reaction will occur if only stoichiometric amounts of mercaptan and oxygen are present. Although the reasons are not fully understood, it is believed necessary to maintain two percent by volume of oxygen because the reaction is rate or equilibrium controlled.

The lower alkyl mercaptans contemplated by this invention are those having from one to four carbons and include methyl mercaptan, ethyl mercaptan, isopropyl mercaptan, n-propyl mercaptan and butyl mercaptan. Sources for obtaining mercaptans for use in this invention include both the petroleum industry and the paper industry. Readily available methods for recovering methyl mercaptan, the most widely used mercaptan, from pulping liquors have been set forth in U.S. Pats. 3,330,009 and 3,326,980.

If the initial contact relative humidity is allowed to go below 70 percent, all the mercaptans will not be converted to disulfide and there will be a leakage of mercaptan through the reactor bed. It is thought that the presence of the required amount of water vapor in the inlet gas stream serves to provide rapid formation and adsorption of the disulfide in the catalyzed reaction.

Conversion of lower alkyl mercaptans by oxidation to dialkyl disulfides may take place at initial contact temperatures between about 27° C. and 82° C. The initial contact humidity required at 27° C. must be at least 0.02 pound of water vapor per pound of dry air and at 82° C. the humidity must be at least 0.35 pound of water vapor per pound of dry air. The preferred contact temperature is between 32° C. and 54° C., which have humidities of at least 0.02 lb. $H_2O$/lb. of dry air and 0.06 lb. $H_2O$/lb. dry air, respectively. The absolute humidities used correspond to a relative humidity of 70 percent over the acceptable temperature range. At temperatures below 27° C. the reaction does not proceed rapidly enough to be effective. At temperatures above 82° C. the ability of the carbonaceous adsorbent to hold the dialkyl disulfides is impaired. Since the reaction is exothermic, the temperature of the adsorption bed may rise as much as 30° C. above the initial contact temperature. The initial contact temperature is the temperature of the gas stream as it contacts the carbonaceous adsorption bed.

The catalytic adsorbents contemplated by this invention include any carbonaceous adsorbent. However, due to adsorbing characteristics of various carbonaceous adsorbents, it has been found that a highly activated granular coal-based carbon is preferred. Typical of the preferred carbons are bituminous coal-based carbons exhibiting large adsorption capacity and rate characteristics. Among activated carbons exhibiting these characteristics are those bituminous carbons having a surface area of 800–1000 m.²/gm., an abrasion number of at least 70, and an iodine number of at least 150. Other carbonaceous adsorbents include, for example, lignite and activated char.

Dialkyl disulfide adsorbed on the carbonaceous adsorbent is removed using various recovery methods. One efficient recovery method removes the disulfides from the carbonaceous adsorbent by contacting the adsorbent with steam, preferably at 1.0 to 15 p.s.i.g. at a temperature between about 125° C. and 316° C. The disulfide and steam mixture is condensed in diluted solutions from 10% to 50% by weight dialkyl disulfide, and the two materials are separated in a decanter. Other disulfide recovery methods include passing nitrogen through the adsorbent bed at elevated temperatures, and washing the adsorbent bed with a suitable solvent. When all the dialkyl disulfide formed is not adsorbed onto the adsorption bed and portions of the disulfide pass through the reactor, other recovery means known to those skilled in the art may be employed. The carbonaceous catalytic adsorbent may then be reused.

The disulfides produced by this process have uses as solvents, soil sterilants, intermediates for more complex organic compounds, in rubber treating, and in textile applications.

The practice of this invention may clearly be seen in the following examples.

EXAMPLE 1

The reaction was carried out in a one-half inch cylindrical reactor charged with approximately 200 grams of a hard granular activated carbon. A gas stream containing methyl mercaptan and air was passed at a flow rate of 0.5 cubic feet per minute through the reactor. The inlet concentration of methyl mercaptan was approximately 2500 parts per million. The initial contact temperature average was approximately 28° C. and the humidity was 0.02 lb. $H_2O$/lb. dry air (70% relative humidity). Disulfide and mercaptan concentrations in the effluent from the reactor were continuously determined with a gas chromatograph. Dimethyl disulfide was collected on the activated carbon adsorbent for a period of 8 hours. During this time no methyl mercaptan or dimethyl disulfide was detected in the effluent gas. Thus, all the methyl mercaptan was converted to dimethyl disulfide and adsorbed onto the carbon.

EXAMPLE 2

In order to compare the effect of humidity on conversion, a second gas stream containing 2500 p.p.m. of methyl mercaptan was reacted at the same conditions as Example 1, except an inlet humidity of 0.002 lb. $H_2O$/lb. dry air (less than 10% relative humidity) was used. Methyl mercaptan was detected in the effluent gas stream after only 1.5 hours. After 2½ hours, 500 p.p.m. of methyl mercaptan "broke through" the adsorption bed without being converted or adsorbed. By "breakthrough" it is meant, that 20% of the inlet methyl mercaptan passes through the reactor without being converted or adsorbed. The rapid breakthrough of methyl mercaptan indicates the necessity of maintaining at least 70% relative humidity in the inlet gas stream.

EXAMPLE 3

The effect of various humidity levels was compared, using the reactor of Example 1. A methyl mercaptan-air gas stream containing approximately 2500 p.p.m. methyl mercaptan was passed into the reactor charged with approximately 200 grams of carbon at 0.5 cubic feet per minute. The table below illustrates the effect of water vapor in the inlet gas stream.

| Relative humidity, percent | Average inlet temperature, °C. | Hours to 20% MeSH breakthrough |
|---|---|---|
| 9 | 27 | 2.10 |
| 20 | 27 | 2.30 |
| 35 | 27 | 2.25 |
| 43 | 32 | 5.5 |
| 70 | 28 | 10.30 |

The results show the significant differences that inlet humidity has on the reaction. A relative humidity of 70% more than quadruples the catalytic activity of the activated carbon adsorbent over low humidities.

EXAMPLE 4

Adsorbed dimethyl disulfide was successfully recovered from 200 grams of an activated carbon adsorbent by contacting the adsorbent with 10 p.s.i.g. saturated steam for approximately two hours. During recovery, water formed during the reaction was also removed from the carbon adsorbent.

EXAMPLE 5

A gas stream containing ethyl mercaptan and air was passed through the one-half inch cylindrical reactor charged with approximately 200 grams of activated carbon at an initial contact temperature of approximately 46° C. at 0.72 c.f.m. The ethyl mercaptan concentration was 2500 p.p.m. and the initial contact relative humidity was 95%. The effluent gas stream was monitored for ethyl mercaptan and diethyl disulfide for six hours with neither passing through the reactor, thus indicating that all the ethyl mercaptan was converted to diethyl disulfide and adsorbed.

While the invention has been described and illustrated by results to various and specific materials and examples it is understood that the invention is not restricted to particular materials, combinations of materials, and procedures selected for that purpose. Numerous values of such details can be employed, as will be appreciated to those skilled in the art.

I claim:

1. A process for the preparation of dialkyl disulfides which comprises contacting a gas stream of a lower alkyl mercaptan and at least 2% by volume of oxygen of an oxygen-containing gas with an activated carbonaceous catalytic adsorbent in an atmosphere of at least 70% relative humidity at a temperature between 27° C. and 82° C. to convert the lower alkyl mercaptan to its corresponding dialkyl disulfide, and recovering the dialkyl disulfide.

2. The process of claim 1 wherein the oxygen-containing gas is oxygen.

3. The process of claim 1 wherein the oxygen-containing gas is air.

4. The process of claim 1 wherein the carbonaceous adsorbent is an activated carbon.

5. The process of claim 1 wherein the lower alkyl mercaptan is methyl mercaptan.

6. The process of claim 1 wherein the dialkyl disulfide is recovered from the carbonaceous adsorbent by contacting the disulfide-containing adsorbent with steam.

References Cited

UNITED STATES PATENTS 2,028,303    1/1936    Turner _____ 260—608

CHARLES B. PARKER, Primary Examiner

D. R. PHILLIPS, Assistant Examiner